United States Patent [19]
Lampe et al.

[11] Patent Number: 5,979,628
[45] Date of Patent: Nov. 9, 1999

[54] ELASTIC WEAR INDICATOR FOR A FRICTION CLUTCH

[75] Inventors: Jörg Lampe, Schwebheim; Thomas Stretz, Gochsheim; Michael Weiss, Dittlebrunn; Georg Kraus, Bergrheinfeld; Reinhold Weidinger, Unterspiesheim; Klaus Gorzitzke, Gochsheim, all of Germany

[73] Assignee: Mannesmann Sachs AG, Schweinfurt, Germany

[21] Appl. No.: 09/071,686

[22] Filed: May 1, 1998

[30] Foreign Application Priority Data

May 6, 1997 [DE] Germany ............................ 197 18 839

[51] Int. Cl.⁶ .................................................. F16D 13/75
[52] U.S. Cl. ..................................... 192/70.25; 192/111 A
[58] Field of Search ............................... 192/70.25, 111 A

[56] References Cited

U.S. PATENT DOCUMENTS 5,513,736  5/1996  Mizukami ........................... 192/111 A
5,540,313  7/1996  Weidinger ........................... 192/70.25

FOREIGN PATENT DOCUMENTS

| 2 599 446 | 12/1987 | France . |
| 40 92 382 | 1/1992 | Germany . |
| 43 06 688 | 11/1993 | Germany . |
| 44 12 107 | 11/1994 | Germany . |
| 43 37 613 | 5/1995 | Germany . |
| 2 264 989 | 9/1993 | United Kingdom . |
| 2 298 251 | 8/1996 | United Kingdom . |
| 2 311 102 | 9/1997 | United Kingdom . |
| 2 323 902 | 10/1998 | United Kingdom . |

*Primary Examiner*—Richard M. Lorence
*Attorney, Agent, or Firm*—Cohen, Pontani, Lieberman & Pavane

[57] ABSTRACT

The invention relates to a motor vehicle friction clutch with automatic wear compensation, in which a wear indicator is provided that, due to its elasticity, exerts a clamping force on the wear adjustment device without any additional spring elements.

13 Claims, 4 Drawing Sheets

ELASTIC WEAR INDICATOR FOR A FRICTION CLUTCH

BACKGROUND OF THE INVENTION

1. Field of the Invention

The invention relates to a motor vehicle friction clutch with an automatic wear compensation device and an axial stop segment which interacts with a flywheel of the clutch for providing wear compensation.

2. Description of the Related Art

German Patent 43 06 688 discloses a motor vehicle friction clutch in which a wear compensation device is arranged between the diaphragm spring and the pressure plate and is controlled by a wear indicator. The wear indicator has an operating lever segment which acts upon the wear compensation device, and also has an axial stop segment, which runs axially in an opening in the pressure plate and is fixable in this opening by tilting. The axial stop segment interacts with the flywheel and, when wear occurs, is moved away from the flywheel by a distance relative to the extent of the wear in the opening of the pressure plate. To produce the friction clamping seat, a spring is provided which exerts a moment on the wear indicator with respect to the flywheel for establishing the friction clamping seat. The spring which exerts the moment on the wear indicator is difficult to arrange and increases the manufacturing complexity of the wear compensation device.

SUMMARY OF THE INVENTION

The object of the present invention is to improve a friction clutch of the prior art such that it can be manufactured more simply and economically while maintaining its function.

According to the invention, this object is attained by providing an operating lever segment of the wear indicator which lies, under elastic internal stress, on elements of the wear compensation device. The elastic embodiment of the operating lever segment, in conjunction with suitable pre-stress in the direction of the elements of the wear compensation device, obviates the requirement of the spring device needed in the prior art. It is not important here that the axial stop segment of the wear indicator may itself eventually experience elastic deformation. Moreover, it is completely possible for multiple wear indicators to be arranged on the circumference of the pressure plate.

It is further proposed that the wear compensation device be prestressed by a separate spring device, whose axial component, when the friction clutch is in the disengaged state, is substantially at equilibrium with the oppositely directed elastic internal stress of the operating lever segment. As in the prior art, the elements of the wear compensation device are pressurized by a spring force, and these elements produce, due to their form, an axial force component that acts on the wear indicator. The elastically prestressed operating lever segment of the wear indicator applies a corresponding counterforce to the spring device of the wear compensation device so that when the friction clutch is in the disengaged state, a state of equilibrium between the spring force of the wear compensation device and the elastic stress of the operating lever segment is established. At the same time, the axial component of the spring force of the wear compensation device maintains the friction clamping seat of the wear indicator in the pressure plate.

According to another feature of the invention, it is advantageous to provide another spring force for producing a force that acts on the pressure plate, whereby this force is also absorbed by the axial force component of the wear compensation device. The force can be produced, for example, by means of tangential leaf springs that connect the pressure plate to the clutch housing in a rotation-proof but axially movable manner. This force acts between the pressure plate and the diaphragm spring when the friction clutch is in the disengaged state and must be applied by means of the wear compensation device during wear compensation.

In an advantageous example of the invention, the pressure plate comprises a bolt element directed away from the flywheel so that the bolt element penetrates an opening in the operating lever segment of the wear indicator. The friction clamping seat is thereby produced via the bolt element and the opening in question. Such a design is advantageous in that the friction clamping seat can be located outside of the pressure plate, which allows the wear indicator to be adjusted to the local conditions in an especially advantageous manner.

According to the invention a second bolt element is attached to the pressure plate radially inside the first bolt element, and which penetrates a second opening in the operating lever segment for preventing the wear indicator from twisting. In this simple fashion, the wear indicator is secured against twisting so that the wear indicator is prevented from deviating from its set position either by centrifugal force or by acceleration forces.

The bolt elements are attached to the pressure plate by pressure seating, riveting, threading, or any other suitable attachment means.

In one embodiment, the axial stop segment and the operating lever segment comprise one integral piece allowing the entire wear indicator to be manufactured from the same elastic material, which results in an especially economical embodiment.

However, it is also possible for the axial stop segment to comprise an axially extending stop bolt that penetrates an opening in the pressure plate, whereby the friction clamping seat of the axial stop bolt is produced in the opening in the pressure plate. In this case, the wear indicator is run in an axially movable fashion in an opening or boring of the pressure plate, and the friction clamping seat is established by the elastic embodiment of the operating lever segment. Such a design saves space, especially in the radial direction, because no part of the wear indicator extends over the outer circumference of the pressure plate.

The two-part embodiment of the wear indicator may advantageously be used to embody the axial stop segment in an especially rigid fashion and the operating lever segment in a substantially elastic fashion. In this way, an unambiguous division of tasks between the two parts is possible.

It is also proposed that a bolt element be attached to the pressure plate radially inside the axial stop segment of the wear indicator. The bolt element extends axially on the side remote from the flywheel and penetrates an opening in the operating lever segment for preventing the twisting of the wear indicator. This provides the wear indicator with simple anti-twisting protection, which counteracts the centrifugal forces and the acceleration and retardation forces that occur during operation.

It is further proposed that the elements of the wear indicator device comprise two adjustment rings, which run concentric to the rotational axis on the pressure plate and are arranged axially one behind the other between the diaphragm spring and the pressure plate. The adjustment rings rest on each other in the regions facing each other via slanted surfaces and are urged relative to each other by at least one spring. The structure of these adjustment rings is known, for example, from the German Document Opened to Public Inspection 44 12 107. When the two adjustment rings slide relative to each other, an axial movement is produced by means of the slanted surfaces, which have an axially ascending gradient. This axial movement enlarges the distance between the diaphragm spring and the pressure plate relative to the amount of wear that has occurred on the friction linings, and ensures that the diaphragm spring exerts the same pressure force on the pressure plate at all times throughout the entire useful life of the friction clutch.

The engagement of the radially inner area of the operating lever segment of the wear indicator into a recess of a first one of the adjustment rings secures the first adjustment ring, via the wear indicator, against twisting relative to the pressure plate. As a result, it is known that if a readjustment is needed, the second one of the adjustment rings must be rotated. An axially deeper recess in the second adjustment ring, relative to the material thickness of the operating lever segment, further ensures that the function of the wear indicator is not impaired by the stress of the diaphragm spring.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1a is an enlarged view of an axial stop element seated in a bore hole of the pressure plate of the friction clutch shown in FIG. 1;

DETAILED DESCRIPTION OF THE PRESENTLY PREFERRED EMBODIMENTS

Figure 1:
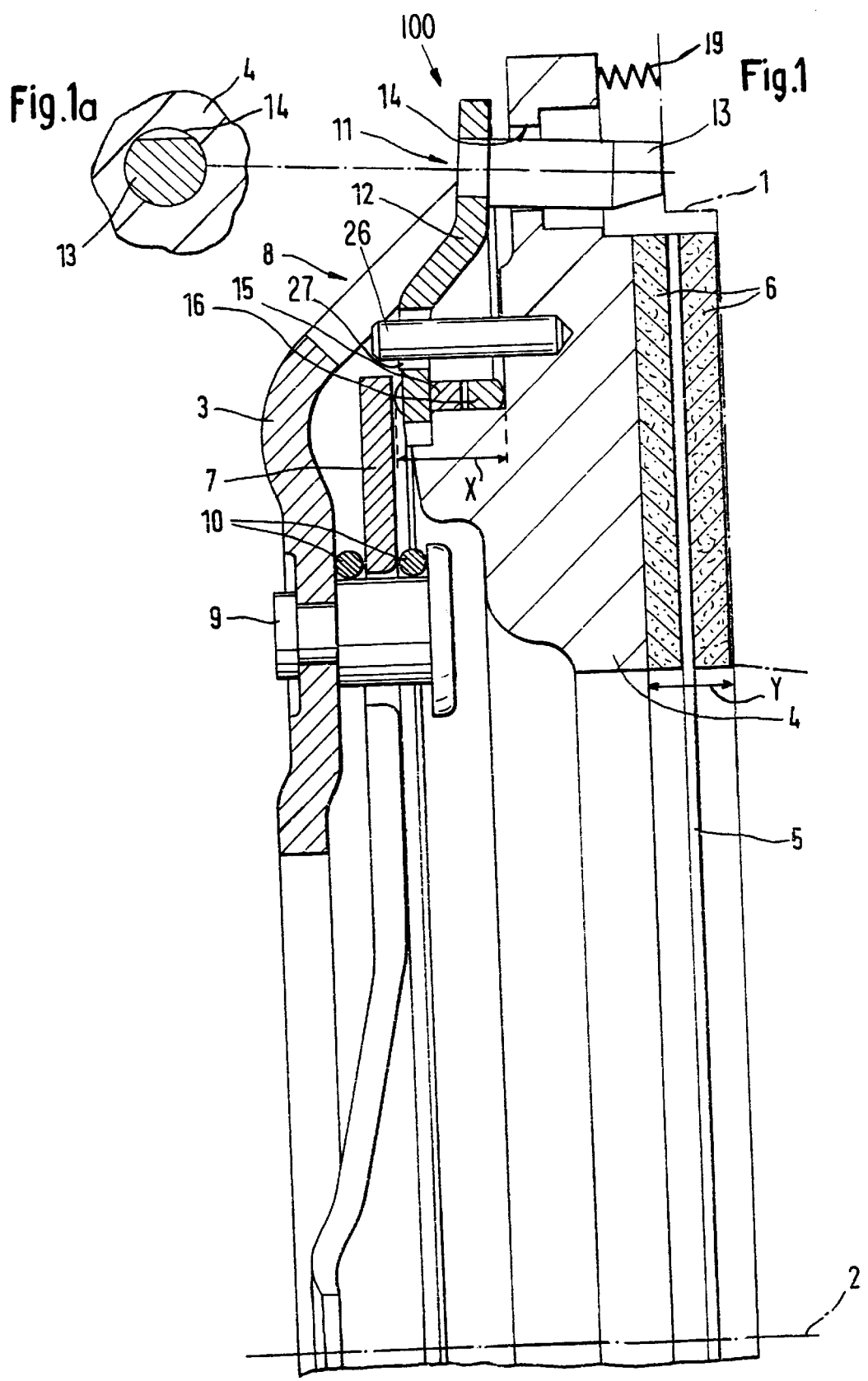
FIG. 1 is a partial longitudinal sectional view through a friction clutch in accordance with the invention in the engaged state and with new friction linings.

Referring to FIG. 1, a flywheel 1 is shown schematically in a partial longitudinal section view of a friction clutch 100 according to the present invention. The flywheel 1 is attached to the crankshaft of an internal combustion engine (the connection and the crankshaft are not shown) and revolves therewith around a rotational axis 2. Attached to the flywheel 1 is a clutch housing 3, which covers all of the components of the friction clutch 100. Multiple spacing bolts 9 (one of which is shown in FIG. 1) are distributed on a circumference of the A clutch housing 3. Two wire rings 10 are fixed on the spacing bolts 9 at a distance from each other. A diaphragm spring 7 is pivotally arranged between the two wire rings 10. A pressure plate 4 is arranged between a radially outer area of the diaphragm spring 7 and the flywheel 1. In the engaged position of the clutch 100 shown in FIG. 1, friction linings 6 of a clutch disk 5 are clamped between the pressure plate 4 and the flywheel 1.

Figure 3:
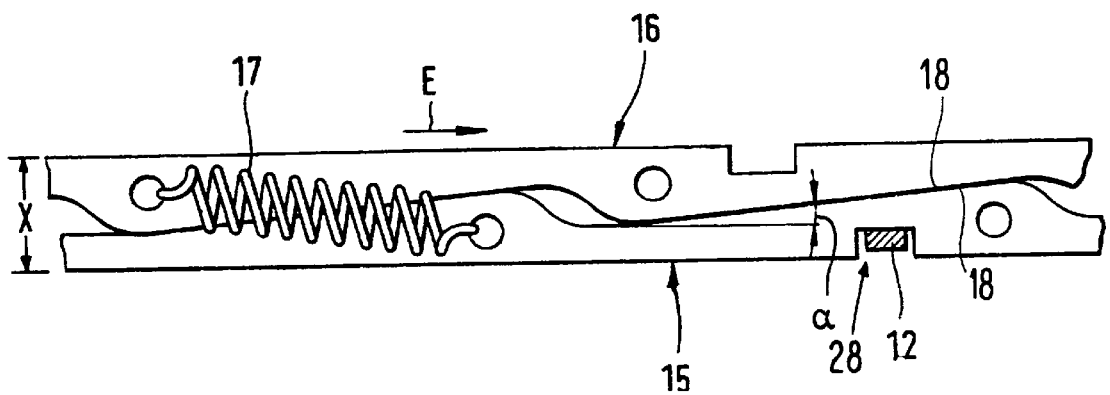
FIG. 3 is a partial view of the wear compensation device comprising two adjustment rings.

The diaphragm spring 7 does not lie directly on the pressure plate 4. Instead, a wear compensation device 8 is mounted between the diaphragm spring 7 and the pressure plate 4. Referring also to FIG. 3, the parts of the wear compensation device 8 comprise two adjustment rings 15 and 16 arranged concentric to the rotational axis 2 on the pressure plate 4. The pressure plate 4 is connected to the clutch housing 3 via tangential leaf springs (not shown in the drawings), for example, and is therefore suspended in a rotation-proof but axially movable fashion. Further, a pneumatic spring 19 is provided between the flywheel 1 and the pressure plate 4 for lifting the pressure plate 4 from the flywheel 1 upon the initiation of the disengagement process. The function of this pneumatic spring 19 may be provided by the tangential leaf springs which urge the pressure plate 4 toward the clutch housing 3.

At least one wear indicator 11 is arranged on the circumference of the pressure plate 4. In the embodiment shown, the wear indicator comprises an axial stop segment 13 and an operating lever segment 12. The axial stop segment 13 penetrates an opening 14 in the pressure plate 4 that runs parallel to the rotational axis 2 and is in a friction clamping seat in said opening 14 of the pressure plate 4. Opening 14 is preferably embodied as a boring. The axial stop segment 13 comprises an axial stop bolt with a flattened portion (see enlarged view in FIG. 1a). The flattened portion is preferably positioned on the radially outer side of the axial stop segment 13 but may also be positioned at any location on the circumference of the axial stop segment 13. A bolt element 26 may be arranged securely on the pressure plate 4 running parallel to the rotational axis 2 on the side of the pressure plate 4 facing away from the flywheel 1 to prevent twisting of the wear indicator 11. The bolt element 26 penetrates an opening 27 in the operating lever segment 12. As FIG. 3 shows, the two adjustment rings 15 and 16, in the areas facing each other, have slanted surfaces 18 on which the adjustment rings 15 and 16 lie against each other. A pretensioned spring 17 urges the two adjustment rings 15 and 16 to slide against each other. The spring 17 is arranged in such a way that, an axial structural space X occupied by the adjustment rings 15 and 16 tends to increase when the two adjustment rings 15 and 16 slide against each other by the force of the spring 17. The angle $\alpha$ of the slanted surfaces 18 is adjusted such that an equilibrium of axial forces is established between the axial force generated by the spring 17 and slanted surfaces 18 and an elastic prestress force of the operating lever segment and will be discussed in greater detail below. FIG. 3 also shows that the radially inner area of the operating lever segment 12 engages a recess 28 of the adjustment ring 15 such that the material thickness of the operating lever segment 12 does not extend over the recess 28, but instead is totally within the recess 28. This thickness of the operating lever segment 12 relates to the fact that, as shown in FIG. 1, the freedom of movement of the wear indicator 11 must not be impaired as a result of the diaphragm spring 7 acting upon the two adjustment rings 15 and 16.

In FIG. 1, the friction clutch 100 is shown in the engaged state and with substantially new friction linings 6. In this state, the pressure plate 4 is a distance Y from the flywheel 1. The distance Y corresponds to the axial extension of the friction linings 6, as well as lining carriers and friction lining spring elements in their compressed position if they are required. In the engaged state, the axial stop segment 13 of the wear indicator 11 rests on the flywheel 1 and the operating lever segment 12 is elastically prestressed in the axial direction; so that the operating lever segment 12 exerts a force in the direction of the pressure plate 4 on the two adjustment rings 15 and 16. In addition, the radially outer area of the diaphragm spring 7 rests on the two adjustment rings 15 and 16 and transmits its clamping force via the pressure plate 4 to the friction linings 6 of the clutch disk 5.

The slanted surfaces 18 of the two adjustment rings 15 and 16 have an angle α such that, taking into account the frictional coefficient between the two parts, the engagement force transmitted from the diaphragm spring 7 ensures that the two adjustment rings 15 and 16 are arrested circumferentially. In this case, there is a self-locking effect. As stated above, the operating lever segment 12 of the wear indicator 11 is elastically prestressed against the two adjustment rings 15 and 16 such that when the friction clutch is in the disengaged state, as in FIG. 2, an equilibrium of forces is established between the resultant force that acts in the axial direction (which is generated by the spring 17 and the slanted surfaces 18) and the spring prestress in the opposite direction (which originates from the prestressed operating lever segment 12).

Figure 2:
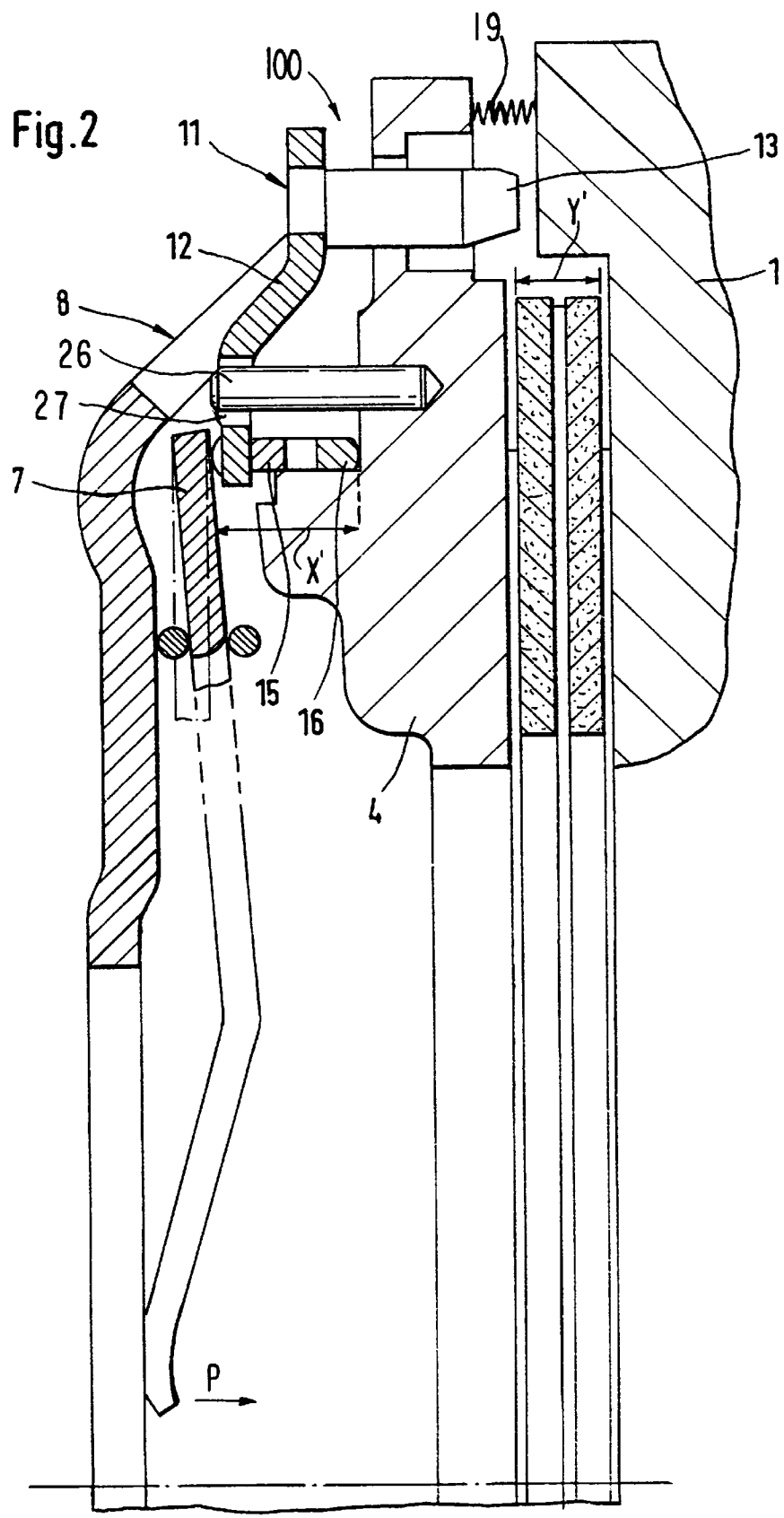
FIG. 2 is a partial longitudinal sectional view of the friction clutch of FIG. 1 in the disengaged state and with the friction linings exhibiting advanced wear.

FIG. 2 shows a disengaged clutch in which the wear of the friction linings is already advanced. This is illustrated by the fact that the distance X' is larger than the distance X in FIG. 1 and by the fact that the axial space Y' of the friction linings is less than the amount Y. The axial space Y' in FIG. 2 thereby relates either to friction linings that are not axially spring-mounted or to friction linings that are spring-mounted but are, as per the drawing, in the compressed state. According to FIG. 2, the friction clutch is disengaged by the application of the force P to the radially inner ends of the flexible tongues of the diaphragm spring 7. As a result, the diaphragm spring 7 pivots about its pivot point, which is established by the two wire rings 10, such that the radially outer area of the diaphragm spring 7 assumes a greater distance from the flywheel 1. The spring 19 or the corresponding pneumatic springs ensure elevation of the pressure plate 4 from the friction linings 6 of the clutch disk 5 as well as contact between the diaphragm spring 7 and the two adjustment rings 15 and 16.

If wear has occurred on the friction linings in a previous engagement process, the axial stop segment 13 of the wear indicator 11 moves axially in the opening 14 (away from the flywheel 1 relative to the pressure plate 4) in response to the amount of wear. As a result of the movement of the wear indicator 11, the elastic prestress force exercised by the operating lever segment 12 on the adjustment rings 15 and 16 is reduced. Upon a subsequent disengagement process, as shown in FIG. 2, the locking force between the two adjustment rings 15 and 16, which is maintained by the high pressure force of the diaphragm spring 7, is eliminated and the two adjustment rings 15 and 16 slide relative to each other by the urging of spring 17 until the equilibrium of forces is reestablished between the axial prestress of the operating lever segment 12 and the spring force of the spring 17, taking into account the ascending gradient angle α. The spring 17 also serves to maintain the friction clamping seat of the axial stop segment 13 in the pressure plate 4. It must be noted that an axial force also originates from the pneumatic spring device 19 and stresses the two adjustment rings 15 and 16 in the disengaged state of the friction clutch 100, whereby this force must also be countered by the spring 17 to achieve the equilibrium state. As FIG. 2 shows, the amount Y' of the axial extension of the friction linings 6 smaller than the amount Y in FIG. 1, due to wear of the friction linings 6, while the distance X' has become larger than the distance X by the same amount. The pressure plate 4 migrates relative to the clutch housing 3 toward the flywheel 1 relative to the amount of wear on the friction linings 6. The diaphragm spring 7 retains its original position due to the axial spatial enlargement of the two adjustment rings 15 and 16. As a result, the force exerted by the diaphragm spring 7 remains constant throughout the entire useful life of the friction clutch 100.

Figure 4:
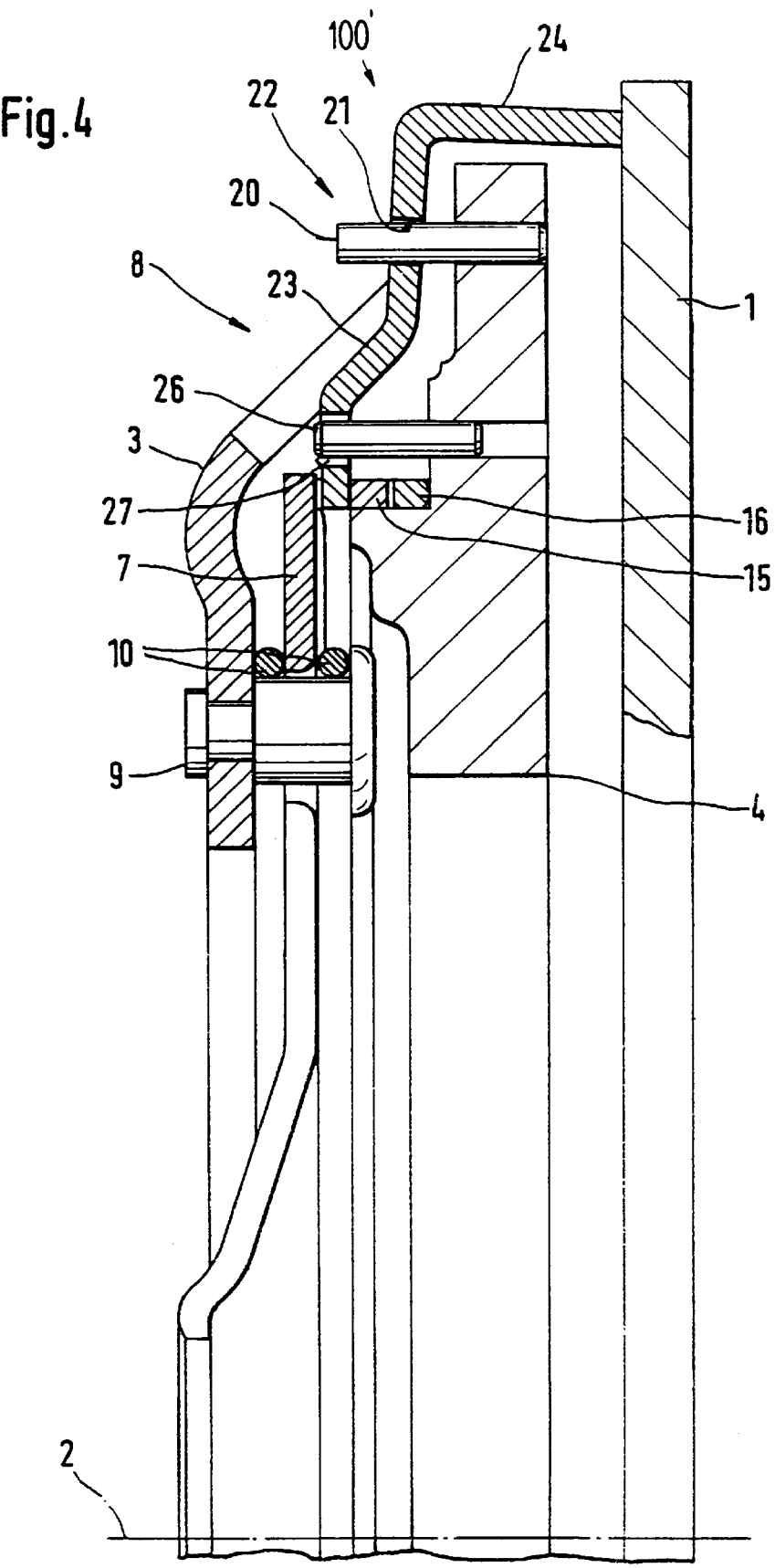
FIG. 4 is a partial longitudinal sectional view of the friction clutch of FIG. 1 with another embodiment of the wear indicator.

FIG. 4 shows a friction clutch 100' with automatic wear compensation, which differs from the design shown in FIG. 1 only in that it has a different wear compensation device 8'. Here, a one piece wear indicator 22 comprises an axial stop segment 24 and an operating lever segment 23 embodied as one piece. The friction clamping seat is established by a bolt element 20 provided in the pressure plate 4. The bolt element 20 runs parallel to the rotational axis 2 on the side of the pressure plate 4 directed away from the flywheel 1. The bolt element 20 penetrates an opening 21 in the operating lever section 23 for the purpose of arresting, in releasable fashion, the wear indicator 22. The function of this friction clutch is identical with that already described in conjunction with FIGS. 1 to 3.

It should be noted that the wear indicator 11, 22 in both embodiments of friction clutch may be arrested not only by frictional force or a friction clamping seat, but simply by devices of the free-wheel type, which prevent the wear indicator 11, 22 from assuming an undesirable greater distance from the pressure plate 4, with the exception of the state that accompanies wear of the friction linings of the clutch disk. Instead of the friction clamping seat, a pure friction force, as known, for example, from the German Document Opened to Public Inspection 43 37 613 may be produced. Free-wheel type devices which may also be used are known, for example, from the French Patent 25 99 446 and the German Patent 40 92 382.

The invention is not limited by the embodiments described above which are presented as examples only but can be modified in various ways within the scope of protection defined by the appended patent claims.

We claim:

1. A friction clutch with automatic wear compensation, comprising:

a flywheel rotatably mounted about a rotational axis of said friction clutch;

a clutch housing rotatably fixedly connected to said flywheel for rotating with said flywheel about the rotational axis;

a pressure plate rotatably fixedly connected to said clutch housing and axially movable with respect to said flywheel;

a clutch disk with friction linings rotatably arranged between said flywheel and said pressure plate wherein said clutch disk is rotatable about the rotational axis relative to said flywheel;

a wear compensation device arranged on a side of said pressure plate opposite said flywheel;

a diaphragm spring having a radially outer end contacting said wear compensation device and pivotally supported relative to said clutch housing at a radially central area between an engaged position whereat said diaphragm spring urges said pressure plate toward said flywheel for frictionally holding said clutch disk therebetween and a disengaged position whereat said diaphragm spring allows said pressure plate to move away from said flywheel for releasing said clutch disk;

a wear indicator device having an axial stop segment axially movably mounted relative to said pressure plate and an operating lever segment contacting said wear compensation device wherein an elastic stress in said operating lever segment is exerted on said wear compensation device; and wherein a spring force of said wear compensation device is applied counter to said elastic stress of said operating lever segment and urges said wear indicator into a friction clamping seat with said pressure plate.

2. The friction clutch of claim 1, wherein said spring force of said wear compensation device comprises a first spring device and wherein an axial component of said spring force is substantially at equilibrium with the oppositely directed elastic stress of the operating lever segment of the wear indicator when said diaphragm spring is in the disengaged state.

3. The friction clutch of claim 2, further comprising a second spring element providing a force urging the pressure plate away from said flywheel, wherein the force urging the pressure plate away from said flywheel is absorbed by the axial component of said spring force of the wear compensation device.

4. The friction clutch of claim 2, further comprising a first bolt element fixedly connected to said pressure plate from a side of said pressure plate remote from the flywheel and axially extending through a first opening in said operating lever segment, wherein the friction clamping seat of the operating lever segment is produced on the first bolt element.

5. The friction clutch of claim 4, further comprising a second bolt element fixedly connected to the pressure plate radially inside the first bolt element and penetrating a second opening in said operating lever segment for the purpose of preventing a twisting motion of said wear indicator.

6. The friction clutch of claim 5, wherein at least one of said first and second bolt element is connected to the pressure plate by a pressure seating, a riveting or a threading engagement.

7. The friction clutch of claim 6, wherein said axial stop segment and said operating lever segment comprise one integral piece.

8. The friction clutch of claim 2, wherein said axial stop segment comprises an axial stop bolt axially penetrating an opening in said pressure plate and said friction clamping seat of said axial stop bolt is produced in said opening in the pressure plate.

9. The friction clutch of claim 8, wherein said wear indicator comprises said axial stop segment and said operating lever segment fixedly connected thereto.

10. The friction clutch of claim 8, further comprising a bolt element fixedly connected to said pressure plate at a position that is radially inside said axial stop segment of the wear indicator and which axially extends through an opening in the operating lever segment thereby preventing a twisting of said wear indicator against twisting.

11. The friction clutch of claim 1, wherein said wear compensation device comprises two adjustment rings which are concentric to the rotational axis and are arranged axially one behind the other between said diaphragm spring and said pressure plate, said adjustment rings resting against each other along slanted surfaces and a spring connected between said two adjustment rings for urging said adjustment rings relative to the other along the slanted surfaces.

12. The friction clutch of claim 11, wherein radially inner areas of said operating lever segment of the wear indicator engage a recess in a corresponding one of the adjustment rings.

13. The friction clutch of claim 12, wherein said recess is axially deeper than the material thickness in the axial direction of said operating lever section.

* * * * *